United States Patent
Schlör et al.

(10) Patent No.: US 7,056,271 B2
(45) Date of Patent: Jun. 6, 2006

(54) FOLDED-THREE-DIMENSIONAL OBJECT, PARTICULARLY A FILTER ELEMENT

(75) Inventors: Ulrich Schlör, Darmstadt (DE); Werner Kadel, Birkenau (DE)

(73) Assignee: Firma Carl Freudenberg, Weinheim (DE)

( * ) Notice: Subject to any disclaimer, the term of this patent is extended or adjusted under 35 U.S.C. 154(b) by 658 days.

(21) Appl. No.: 09/971,505

(22) Filed: Oct. 5, 2001

(65) Prior Publication Data

US 2002/0072459 A1 Jun. 13, 2002

(30) Foreign Application Priority Data

Oct. 6, 2000 (DE) ................................ 100 49 980

(51) Int. Cl.
*B31B 1/26* (2006.01)
(52) U.S. Cl. ....................... 493/405; 493/966; 428/182
(58) Field of Classification Search .................. 493/40, 493/405, 966; 428/181, 182, 183, 184, 185
See application file for complete search history.

(56) References Cited

U.S. PATENT DOCUMENTS

| | | | | | |
|---|---|---|---|---|---|
| 2,556,521 | A | * | 6/1951 | Chase | 493/405 |
| 2,897,971 | A | * | 8/1959 | Gewiss | 493/405 |
| 2,922,239 | A | * | 1/1960 | Glynn | 493/405 |
| 3,302,321 | A | * | 2/1967 | Walker | 493/405 |
| 3,894,352 | A | * | 7/1975 | Hooker | 493/405 |
| 6,309,438 | B1 | * | 10/2001 | Kanno et al. | 493/405 |

FOREIGN PATENT DOCUMENTS

DE 44 35 532 11/1996

\* cited by examiner

*Primary Examiner*—Louis Huynh
(74) *Attorney, Agent, or Firm*—Keynon & Kenyon LLP

(57) ABSTRACT

A three-dimensional object folded from a flat work piece, particularly a filter element folded from a nonwoven fabric, characterized in that the three-dimensional object (20) is made up of several rows (5, 6, 7) of hollow pyramid elements (30) that are joined in rows and nested into one another.

11 Claims, 6 Drawing Sheets

FOLDED-THREE-DIMENSIONAL OBJECT, PARTICULARLY A FILTER ELEMENT

FIELD OF THE INVENTION

The invention relates generally to a folded three-dimensional object, and more particularly to a filter element.

DESCRIPTION OF RELATED ART

Folded three-dimensional objects that were folded from work pieces that were originally flat are used for various purposes, whether for reinforcement of sandwich-like sheets or also as decorative lamp shades, and also in the technical sector. To the extent that this involves objects folded in zig-zag shape, their production by machine is possible and has been tested many times. It is more difficult to produce three-dimensional geometries that deviate from the zig-zag shape.

For the production of zig-zag-shaped, folded filters, it is known from DE 44 35 532A1 to pre-emboss the filter material in the form of a continuous web, to fold it in zig-zag shape, and subsequently to fix it in place.

SUMMARY OF THE INVENTION

It is an object of the invention to produce a three-dimensional object that can be used in many different ways, from a flat work piece, by folding it. It is a further object of the invention to produce such an object which is supposed to have a decorative appearance, for example with regard to decorative lighting effects, as well as filter technology properties and also acoustical properties. These and other objects are achieved according to the invention, in that the three-dimensional object is made up of several rows of hollow pyramid elements that are joined in rows and nested into one another. These are pyramid elements with a particular shape—the base edge is three-dimensional. They are each made up of two mirror-image halves. Their three-dimensional base area has two trapezoids that abut one another with their smaller base lines. Each half has a main area and two secondary areas that directly follow the main area and are directed towards the inside of the pyramid elements, where the secondary areas of the halves that face one another are connected with one another by their interior fold. The main areas and/or the secondary areas are folded at an angle range of more than 30°, preferably between 60° and 80°, relative to the base area of the element. This is the preferred range for filter elements. Other ranges, particularly for purposes other than filtering, are also possible, of course. For filter and acoustical properties, the filter element is preferably produced from a nonwoven fabric.

BRIEF DESCRIPTION OF THE DRAWINGS

The invention will be explained in greater detail, using an exemplary embodiment.

The drawings show.

DETAILED DESCRIPTION OF THE INVENTION

Figure 1:
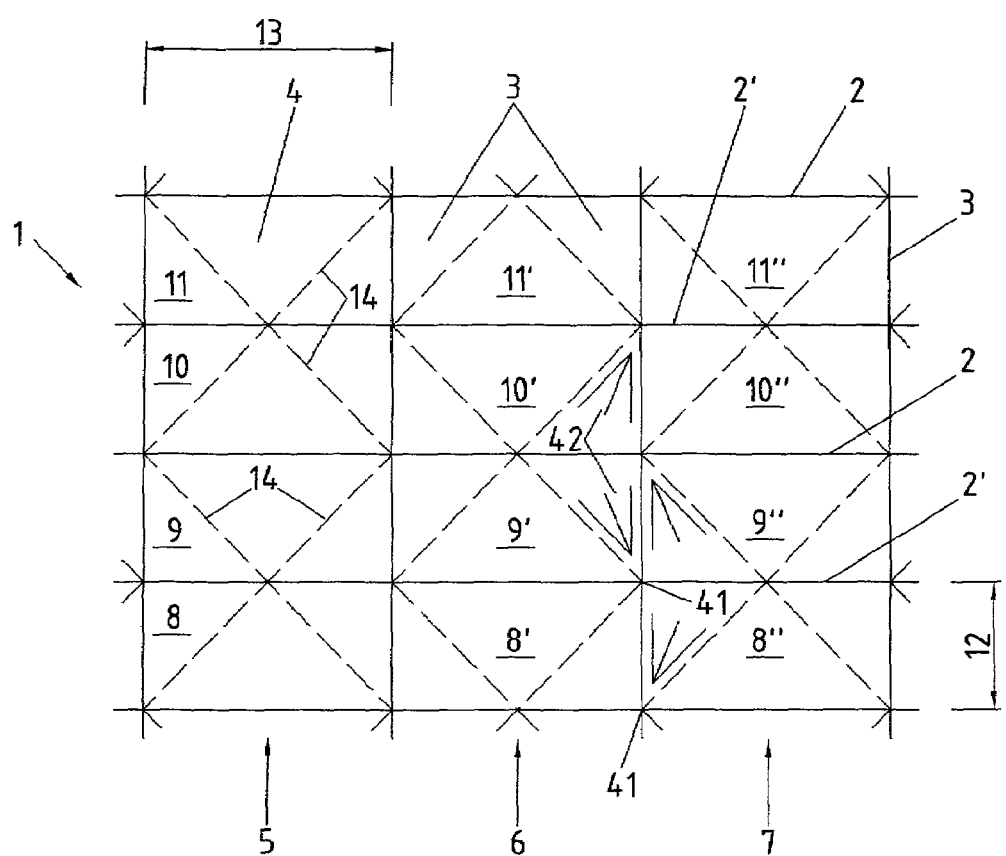
FIG. 1: a flat work piece with predetermined folding lines, in a top view.

The pyramid elements that lie behind one another in a row are connected with one another at their crosswise folds, and the pyramid elements of the rows that lie next to one another are connected at their lengthwise folds. The pyramid elements are therefore structured to be hexagonal, with two main areas and four secondary areas directed towards the interior of the pyramid elements.

To support folding by machine, the secondary areas are provided with an elastic region. Preferably, this elastic region is formed by a corrugation embossing that is aligned in fan shape. However, it is also possible here to structure the material itself to be elastic, so that sufficient compression and expansion of the material can be achieved while it is being folded.

The object produced in this way can have different final shapes. One possibility is to roll the object into a cylinder. The join of the rolled-up cylinder is preferably formed by a nested overlap. At its edges, the cylinder can be held in ring-shaped frames. Such a cylinder then has approximately the shape of a lantern, or of a filter cartridge, depending on the purpose of use.

Objects with concave-shaped ancillary areas can be framed with a frame, particularly one made of a polymer material.

The process for the production of the object is characterized in that the flat work piece is provided with parallel lengthwise predetermined folding lines and, perpendicular to them, also parallel crosswise predetermined folding lines, forming a rectangular pattern made up of rectangles, where the distance between the crosswise predetermined folding lines is twice as great as the distance between the lengthwise predetermined folding lines. In this connection, two adjacent rectangles that lie in a row, in each instance, are brought together to form square areas, where the individual areas are offset, relative to one another, by half an edge length. The diagonals of these areas are also provided with predetermined folding lines, which can be folded in the opposite direction relative to the lengthwise and crosswise predetermined folding lines, and the work piece prepared in this way is subjected to a folding process along the predetermined folding lines, in the directions predetermined by the folding lines. Placement of the predetermined folding lines is performed using known methods. The folding process performed on the work piece is performed by supporting the folding edges of two adjacent main areas of the pyramid elements from one side of the work piece, and pressing in the main areas of the pyramid elements from the other side of the work piece. Support is provided by way of flat support units with a folding edge, and pressing in is carried out by way of isosceles triangular pressing plates with the same size, that can be pivoted about their base line, that press against the support units.

During the folding process, the support units and the pressing plates perform a movement that is directed towards the focus point of the tool. For this purpose, the support plates and pressing plates are synchronously moved in a two-axis guidance system with orthogonally arranged axes.

A device for the production of the folded object, i.e. for carrying out the process for the production of the object, is also an object of the present invention. This device is provided with a press opening that holds the flat work piece, which has several support units arranged in rows on the die side, and also several pressing plates arranged in rows on the punch side, corresponding to the support units, where the pressing plates can be pivoted around their base line from a level position to an angular position relative to it. In addition to this pivoting movement, the support units and the pressing plates are guided, during the pivoting movement of the pressing plates, on guide rails that are arranged at right angles to one another, lying in the horizontal plane, and move in the direction of a focus point of the press.

The pressing plates themselves are made up of isosceles right triangles that are connected at their base lines by a hinge. The edge lengths of the support units and the lengths of the base lines are the same. Activation of the pressing plates takes place by way of rams that are present in pairs. In this connection, the rams can be guided via a parallel rod.

The exemplary embodiments shown in the drawings relate to the production of a filter element from a nonwoven fabric. FIG. 1 shows a flat work piece 1 that was cut from a nonwoven fabric web. This work piece 1 is selected, in terms of its material properties, in such a way that it is suitable for the production of a filter element. Work piece 1 is provided with predetermined folding lines 2, 2', and 3 on its top side, as seen in the drawing. Predetermined folding lines 2, 2', and 3 are placed on top 4 of work piece 1. Lengthwise predetermined folding lines 2 and 2' run parallel to one another; crosswise predetermined folding lines 3 are also aligned parallel to one another and are perpendicular to lengthwise predetermined folding lines 2 and 2'. The distance between crosswise predetermined folding lines 3 is twice as great as the distance between lengthwise predetermined folding lines 2 and 2'. In this way, a rectangular pattern made up of rectangles 8, 9, 10, 11, 8', 9', 10', 11', and 8", 9", 10", 11", lying in rows 5, 6, and 7, respectively, is formed. Two adjacent rectangles that lie in a row 5 to 7, in each instance, are brought together to form square areas. In this connection, the individual areas are offset relative to one another by half an edge length 12. In the present example, rectangles 8 and 9 in row 5, rectangles 8' and 9' in row 6, and rectangles 8" and 9" as well as 10" and 1" in row 7, are brought together. In this manner, squares are formed. The diagonals of the squares are provided with predetermined folding lines 14 on the other side of work piece 1, which is the bottom in the illustration. These predetermined folding lines 14 have the result that the work piece can be folded at these folding lines, in the opposite direction from folding lines 2, 2', and 3. In order to form pyramid elements 30 of three-dimensional object 20, work piece 1 is folded in accordance with predetermined folding lines 2, 2', 3, and 14.

To support the folding process, particularly in the case of objects with very high pyramid elements 30, it is advantageous if pyramid elements 30 are provided with elastic regions 42 in the secondary areas, which permit compression of the pyramid walls during the folding process. This compression can be achieved, for example, by way of a corrugated structure of secondary areas 34, 35. In the drawing, only some regions 42 are shown as examples.

Figure 2:
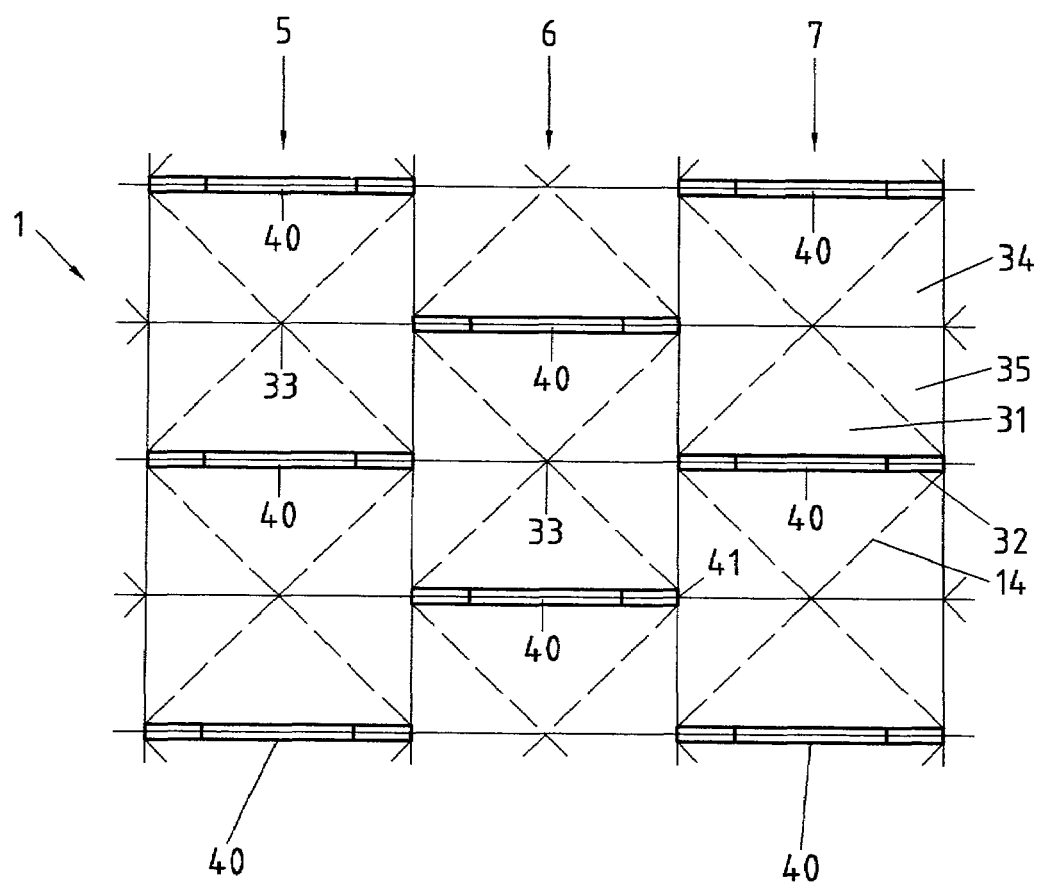
FIG. 2: the work piece according to FIG. 1, with support units set against it.

FIG. 2 shows the same top view as in FIG. 1, with the additional information that support units 40, which are provided for the folding process, are already drawn in. As is evident from FIG. 2, support units 40 form the delimitation of the square areas in the individual rows 5 to 7. All the other parts of FIG. 2 are identical with FIG. 1. Pyramid elements 30 are formed by pressing in main areas 31 around support units 40. The main areas are delimited by a base line 32 and diagonals 14, so that they are made up of an isosceles triangle. Tips 33 of pyramid elements 30 lie in the intersections of diagonals 14. As a result of the folding process, a total of five pyramid elements 30, with their main areas 31 and secondary areas 34 and 35, is formed, with the section shown in FIGS. 1 and 2. Secondary areas 34 and 35 are delimited by predetermined folding lines 3, 14, and 2'.

Figure 3:
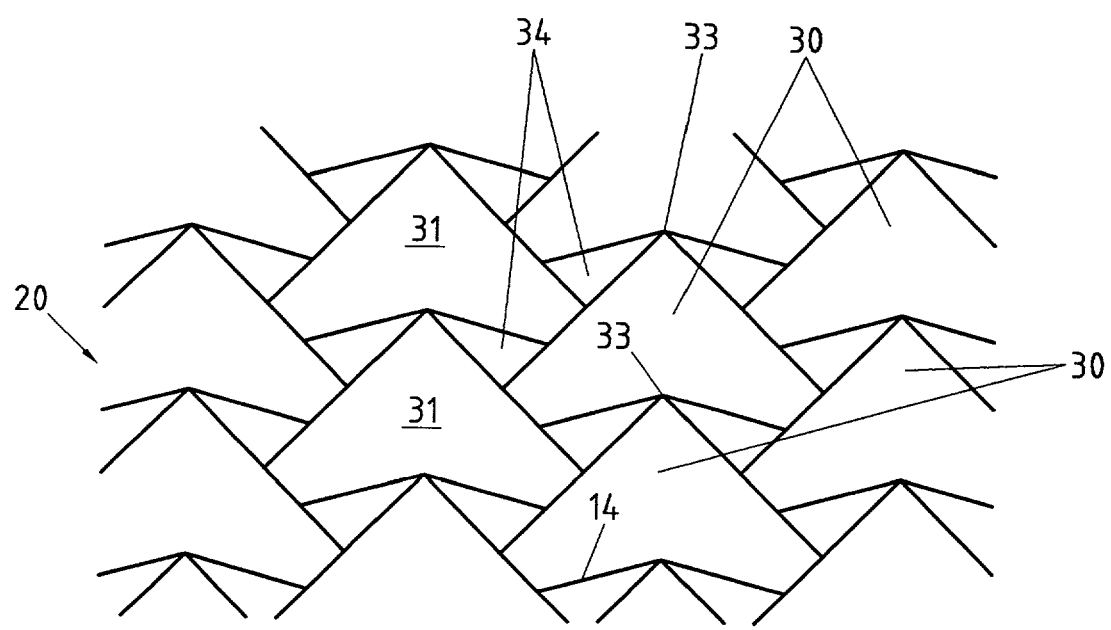
FIG. 3: the folded object in a slanted view from the top.

FIG. 3 shows a finished folded object, specifically in a slanted view from the top. The individual pyramid elements 30 cover one another. Main areas 31 and secondary areas 34, which are directed into the interior of the element for the individual pyramid elements 30, can be seen. Secondary areas 34 are delimited by folds 21 and diagonal predetermined folding lines 14. Secondary areas 35 cannot be seen, i.e. they are covered.

Figure 4:
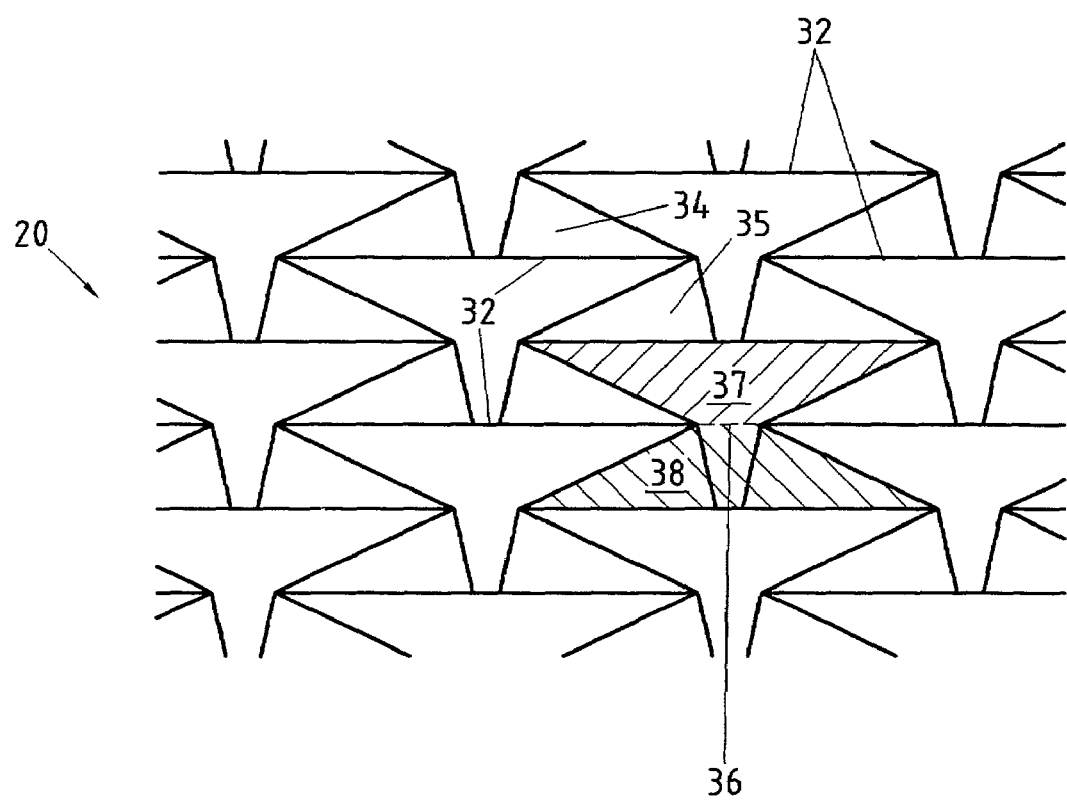
FIG. 4: the folded object in a slanted view from the bottom.

FIG. 4 shows the other side of folded object 20, in a slanted view from the bottom. Base folds 32, which were formed at lengthwise predetermined folding lines 2, and remain the same in their fold length, can be seen. As a result of the folding process, the base folds are pushed into one another, resulting in nesting of the individual pyramid elements 30. Secondary areas 34 and 35 can be seen. It is evident that the base area of a pyramid element 30 is formed from two trapezoids 37, 38. Each trapezoid 37, 38 is formed from base folds 32 for main area 31, folds 3, and an imaginary smaller base line 36. Smaller imaginary base line 36 lies between two base folds 32 of main area 31 that lie in the same line. In the figure, trapezoids 37 and 38 are drawn with broken lines, on a base area of a pyramid element 30.

The device for implementing the process is made up essentially of a top part and a bottom part. The base plates of the top part and the bottom part are arranged with their surfaces parallel to one another, and are moved towards each other with their surfaces parallel to one another during the folding process. The support units are in the top part, the pressing plate elements are in the bottom part.

Figure 5:
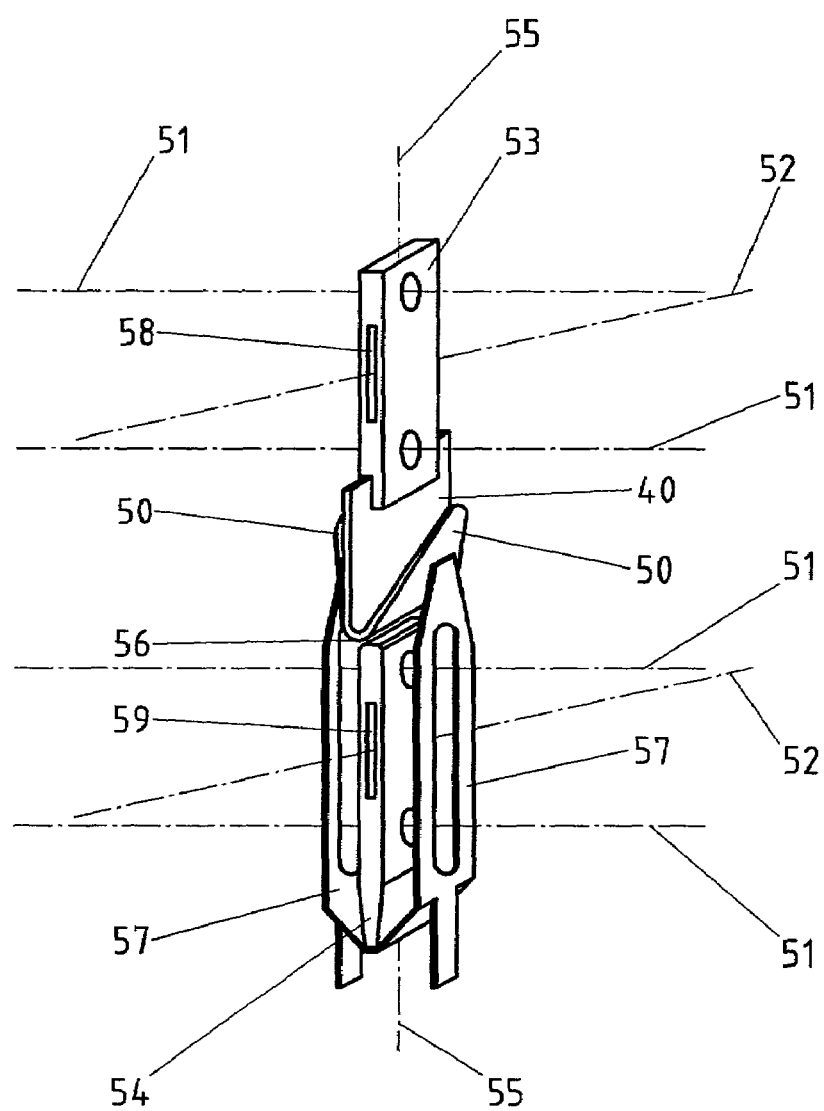
FIG. 5: an individual support unit with the related pressing plates in a slanted view from the side.

FIG. 5 shows an individual part of the device for the production of the object, where it should be noted that the device is formed from a plurality of such individual parts, depending on the size of the object to be produced. In the schematic representation, flat support unit 40 and its opposing pressing plates 50 can be seen. These two elements, both support units 40 and pressing plates 50, can be moved, during the folding process, into planes that are perpendicular to one another, as is shown with dot-dash lines 51, 52. Dot-dash lines 51 show the axis direction that is the same as the direction of rows 5 to 7 of work piece 1. Dot-dash lines 52 show the axis direction that runs at a right angle to this. Axes 52 are formed by flat guide elements that ensure guided, sufficient displacement of holders 53 and 54 for support units 40 for pressing plates 50. The guide elements, which are not shown in greater detail, are guided in slits 58 and 59 of holders 53 and 54. This movement possibility is indicated with dot-dash line 55. It is required so that the individual sheet to be folded can be placed between support units 40 and pressing plates 50. In FIG. 5, pressing plates 50 are already partially pivoted around their base line 56. Axes 51 are moved with them, with holders 53 and 54. These are round guide rails that can be moved up and down with holders 53 and 54, while the holders themselves can slide along the guide rails during the folding process.

To activate pressing plates 50, pendulum supports 57 are provided; they are arranged in pairs and are connected with one another at their ends by way of a lattice-gate-type connector 58.

The ends of guide rods 51 and guide rails 52 are fixed in place in vertical strips with vertical grooves (not shown). This allows a vertical relative movement in axis 55 of the support elements relative to the pressing plates and therefore insertion and removal of the work piece. The arrangement of the grooved vertical strips on lattice gates is not shown; this allows an equidistant displacement of the support elements and the pressing plates both in displacement axis 51 and in displacement axis 52. The pivoting movement of pressing plates 50 takes place by activating rams 57. This is accomplished by moving up base plate 60, on which rams 57 rest.

A support element is made up essentially of a spatula-like element that fixes the folding edge in place. A pressing plate element is made up essentially of two triangular, pivoting pressing plates arranged in a mirror image. These fold the two mirror-image triangular main areas of the object inward, in each instance, where the two main areas have a common fold that is fixed in place by the support element. The pressing plates have a hinge at their hypotenuse, in each instance, and are activated by way of ram elements that are mounted according to the principle of a parallel rod.

One support element and one pressing plate element form a pair with a common vertical axis, in each instance. By way of a two-axis guide system, all of the pairs can be moved in a plane, parallel to the base plates, in two axes that lie at right angles to one another. When the pressing plates pivot inward, the pressing plates have a third degree of freedom in their movement, in addition. The movements in the three axes are kinematically coupled and are partly coupled mechanically, according to the lattice gate principle. The ram movement is preferably coupled electrically.

Figure 6:
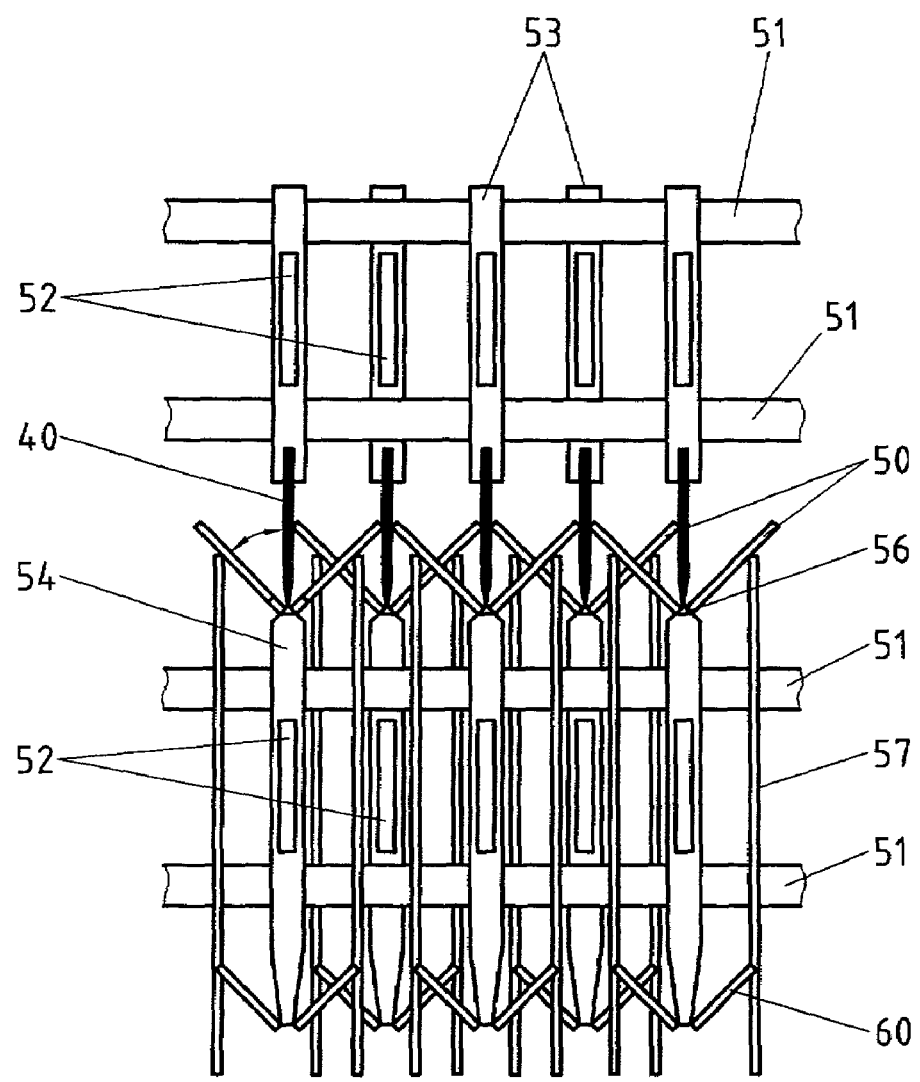
FIG. 6: schematically, two rows of support units and pressing plates in a side view.

FIG. 6 shows a detail of the device, in a side view. Here, two rows of support units 40 and pressing plates 50 that lie behind one another are shown. Here again, pressing plates 50 are already partially pivoted. In order to make the illustration easier to understand, work piece 1 is not inserted. It is located between support units 40 and pressing plates 50. Pressing plates 50 move around hinges 56 and pivot upward. The pivoting movement is controlled by parallel rods 60. Parallel rods 60 hold rams 57, which are arranged in pairs, in the predetermined position. During the folding process, work piece 1 is compressed due to the pivoting movement of pressing plates 50, while holders 53 and 54 move towards on another in such a way that the distance between them is decreased. As soon as the desired fold angle of the object to be folded has been reached, which is comparable with the angle between support unit 40 and a pressing plate 50, the press is opened, in that holders 53 and 54 are moved apart, and folded object 20 can be removed from the press.

What is claimed is:

1. A three-dimensional object folded from a flat work piece, wherein the three-dimensional object (20) is comprised of several rows (5, 6, 7) of hollow pyramid elements (30) that are joined in rows and nested into one another.

2. The object according to claim 1, wherein the flat work piece is a nonwoven fabric and the three-dimensional object is a filter element.

3. The object according to claim 1, characterized in that the pyramid elements (30) are each made up of two mirror-image halves.

4. The object according to claim 1 wherein the base area of the pyramid elements (30) is made up of two trapezoids (37,38) that abut one another with their smaller base lines (36).

5. The object according to claim 1 wherein the halves of the pyramid elements (30) have a main area (31) and two secondary areas (34, 35) that directly follow the main area and are directed towards the inside of the pyramid elements (30), where the secondary areas (34, 35) of the halves that face one another are connected with one another by their interior fold.

6. The object according to claim 5 wherein the main areas (31) or the secondary areas (34, 35) are folded at an angle range of more than 30°, relative to a base area of the object (30).

7. The object according to claim 6 wherein the angle range is between 60° and 80°.

8. The object according to claim 5 wherein the secondary areas are provided with an elastic region.

9. The object according to claim 8 wherein the elastic regions (42) are formed by corrugation embossings.

10. The object according to claim 1 wherein the pyramid elements that lie in a row (5, 6, 7) behind one another are connected at a crosswise fold (3), and the pyramid elements (30) in the rows that lie next to one another are connected at a lengthwise fold (2, 2').

11. The object according to claim 1 wherein the pyramid elements (30) are structured to be hexagonal, with two main areas (31) and four secondary areas (34, 35) that are directed towards the inside of the pyramid elements (30).

* * * * *